(No Model.)

G. F. BARKER.
SHAFT COUPLING.

No. 355,052. Patented Dec. 28, 1886.

Witnesses:
N. E. Jones
G. F. Downing

Inventor:
Geo. F. Barker.
B. F. A. Simpson.

UNITED STATES PATENT OFFICE.

GEORGE F. BARKER, OF LOWELL, MASSACHUSETTS.

SHAFT-COUPLING.

SPECIFICATION forming part of Letters Patent No. 355,052, dated December 28, 1886.

Application filed March 30, 1886. Serial No. 197,176. (No model.)

*To all whom it may concern:*

Be it known that I, GEORGE F. BARKER, of Lowell, in the county of Middlesex and State of Massachusetts, have invented certain new and useful Improvements in Shaft-Couplings; and I do hereby declare the following to be a full, clear, and exact description of the invention, such as will enable others skilled in the art to which it appertains to make and use the same.

My invention relates to an improvement in shaft-coupling, the object of the same being to provide a simple and cheap device that can be easily and quickly secured to the ends of the adjacent sections of shaft; and it consists in the parts and combinations of parts, as will be more fully explained, and pointed out in the claims.

Figure 1:
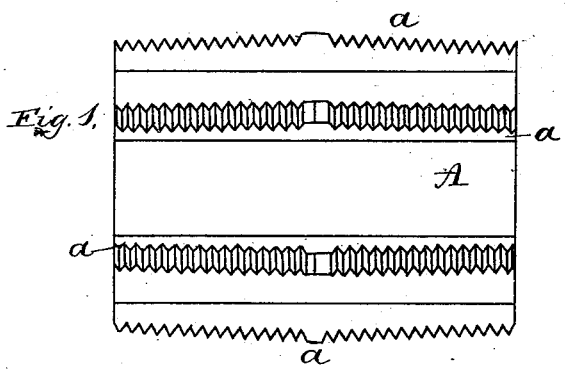
Figure 2:
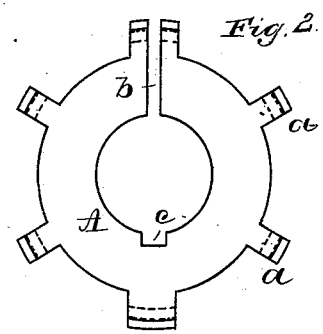
Figure 3:
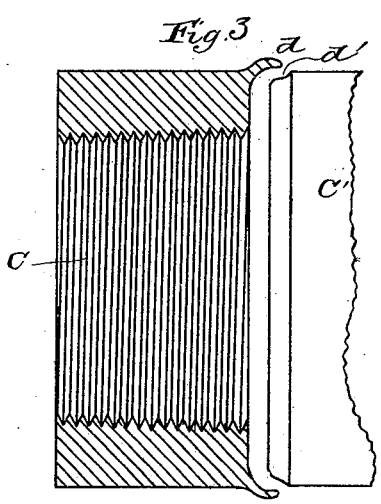
Figure 4:
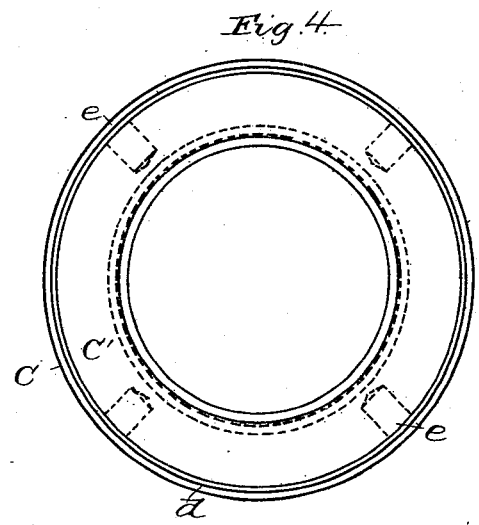
Figure 5:
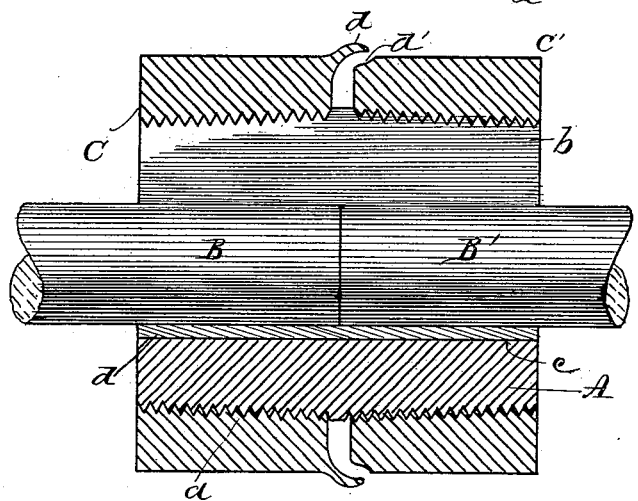

In the accompanying drawings, Figure 1 is a view in elevation of the split sleeve. Fig. 2 is an end view of the same. Fig. 3 is a view of the screw-nuts, showing one in section and one in elevation. Fig. 4 is an end view of the nut shown in section in Fig. 3; and Fig. 5 is a sectional view through the nuts and sleeve, showing the shaft-sections in position therein.

A is a sleeve having a bore constructed to closely embrace the ends of the shaft-sections and provided at suitable intervals apart on its outer surface with the ribs $a$, extending throughout the entire length of the sleeve. The outer surfaces of these ribs taper from a point near the center of the sleeve toward each end, and are screw-threaded on their outer faces to engage the female screw-threads of the nuts, as will be hereinafter described. The outer surface of this sleeve can be cylindrical or it can taper from a point near its center toward each end, and is split longitudinally, as shown at $b$, to permit the same to be clamped to the shaft-section. This split or kerf $b$ can be formed in the sleeve at a point between two ribs or through one of the ribs, dividing the latter into two parts, as shown in Fig. 2; or the sleeve can be formed in two or more sections, each section being provided with one or more screw-threaded ribs. This sleeve is also provided internally with the groove $c$, in which the spline or key $d$, which engages the shaft-sections B B', rests.

C C' are the nuts, each of which is screw-threaded internally to engage the threads on the outer surfaces of the ribs $a$ of the sleeve A, and are made tapering on their inner faces to correspond with the tapering ends of the sleeve. The inner end of the nut C is provided on its outer edge with a flaring lip, $d$, which latter, when the parts are in position, rests within the circumferential groove $d'$, formed on the outer edge of the inner end of the nut C, and forms a neat joint. The nuts are each provided with holes $e$ for a spanner-wrench, by which they are turned.

To apply the device to the sections of a shaft it is simply necessary to place the sleeve over the adjacent ends of the shaft-sections and insert the key, after which the nuts are screwed into a position so as to envelop the sleeve. The operation of forcing the nuts in position causes the split or sectional sleeve to closely embrace the shaft-sections, and locks the parts securely in position.

By providing ribs having screw-threads instead of screw-threading the entire outer surface of the sleeve, the frictional contact between the sleeve and nuts is reduced to a minimum, which permits the sleeve to be easily and quickly screwed home.

It is evident that slight changes in the construction of the several parts of my device might be resorted to without departing from the spirit of my invention; hence I would have it understood that I do not confine myself to the exact construction shown and described, but consider myself at liberty to make such changes as fairly fall within the spirit and scope of my invention.

Having fully described my invention, what I claim as new, and desire to secure by Letters Patent, is—

1. The combination, with a split sleeve constructed to closely embrace shaft-sections and provided with longitudinal ribs screw-threaded on their outer faces, of a nut having screw-threads adapted to engage the screw-threads on the ribs, substantially as set forth.

2. The combination, with a split sleeve having ribs screw-threaded on their outer faces, of nuts having internal threads adapted to engage the threads on the ribs.

3. The combination, with a split sleeve having a screw-threaded outer surface and constructed to closely embrace the adjacent ends of shaft-sections, of nuts having internal threads adapted to engage the threads on the sleeve, one of said nuts having a projecting
5 lip adapted to rest in a groove formed on the adjacent end of the other nut, substantially as set forth.

In testimony whereof I have signed this specification in the presence of two subscribing witnesses.

GEORGE F. BARKER.

Witnesses:
 JOHN W. REED,
 DANL. R. WALLACE.